(12) United States Patent
Burch et al.

(10) Patent No.: US 8,795,799 B2
(45) Date of Patent: Aug. 5, 2014

(54) POLYIMIDE RESINS FOR HIGH TEMPERATURE APPLICATIONS

(75) Inventors: Robert Ray Burch, Exton, PA (US); Jesus G Moralez, Wilmington, DE (US); Susan H Tilford, Ewing, NJ (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/823,120

(22) PCT Filed: Sep. 29, 2011

(86) PCT No.: PCT/US2011/053983
§ 371 (c)(1),
(2), (4) Date: Mar. 14, 2013

(87) PCT Pub. No.: WO2012/050972
PCT Pub. Date: Apr. 19, 2012

(65) Prior Publication Data
US 2013/0171396 A1     Jul. 4, 2013

Related U.S. Application Data

(60) Provisional application No. 61/387,605, filed on Sep. 29, 2010.

(51) Int. Cl.
*B29D 22/00* (2006.01)
*B29D 23/00* (2006.01)
*B32B 1/08* (2006.01)
*B32B 27/10* (2006.01)
*C08K 3/22* (2006.01)
*C08L 79/08* (2006.01)
*C08K 3/00* (2006.01)

(52) U.S. Cl.
CPC ............ *B29D 22/00* (2013.01); *B29D 23/00* (2013.01); *B32B 1/08* (2013.01); *B32B 27/10* (2013.01); *C08K 3/0041* (2013.01); *C08K 3/22* (2013.01); *C08L 79/08* (2013.01)
USPC ........ 428/35.7; 428/36.9; 428/64.1; 428/156; 524/497

(58) Field of Classification Search
CPC .......... B29D 22/00; B29D 23/00; B32B 1/08; B32B 27/10; C08K 3/0041; C08K 3/22; C08L 79/08
USPC ................ 428/36.9, 64.1, 156, 35.7; 524/497
See application file for complete search history.

(56) References Cited

U.S. PATENT DOCUMENTS

| 3,579,310 A | 5/1971 | Lewis et al. |
| 2006/0160926 A1 | 7/2006 | Horacek et al. |

FOREIGN PATENT DOCUMENTS

EP   341703 A2   11/1989

*Primary Examiner* — Michael C Miggins

(57) ABSTRACT

Polyimide resin compositions that contain an aromatic polyimide, graphite, and acicular titanium dioxide are found to exhibit high thermal oxidative stability. Such compositions are especially useful in molded articles that are exposed to high temperatures, such as bushings, bearings, and seal rings that are used in aerospace, transportation, and materials handling applications.

13 Claims, No Drawings

POLYIMIDE RESINS FOR HIGH TEMPERATURE APPLICATIONS

This application claims priority under 35 U.S.C. §119(e) from, and claims the benefit of, U.S. Provisional Application No. 61/387,605, filed Sep. 29, 2010, which is by this reference incorporated in its entirety as a part hereof for all purposes.

TECHNICAL FIELD

This disclosure relates to filled polyimide resin compositions that are useful for high temperature applications that require high thermal oxidative stability, such as aircraft engine parts.

BACKGROUND

The unique performance of polyimide compositions under stress and at high temperatures have made them useful in applications requiring high thermal oxidative stability. Some examples of such applications are aircraft engine parts, aircraft wear pads, automatic transmission bushings and seal rings, tenter frame pads and bushings, material processing equipment parts, and pump bushings and seals.

Despite the variety of polyimide compositions, and additives for those compositions such as graphite, that have previously been available, a need still remains for polyimide compositions that exhibit as molded parts the desirably high degree of thermal oxidative stability currently required for applications such aircraft engine parts, while maintaining the other advantageous attributes of the polyimide material.

SUMMARY

Disclosed herein are compositions comprising in admixture (a) an aromatic polyimide in an amount of about 30 weight parts to about 90 weight parts; (b) acicular titanium dioxide particles in an amount of about 0.5 weight parts to about 12 weight parts; and (c) graphite in an amount of about 0 weight parts to about 60 weight parts; wherein all weight parts combined together total to 100 weight parts.

In another embodiment, there is disclosed herein a composition comprising in admixture (a) an aromatic polyimide in an amount between about 30 and about 90 weight parts; (b) acicular titanium dioxide particles in an amount between about 0.5 and about 10 weight parts, wherein the average particle diameter is between about 10 and about 500 nm and the average particle length is between about 1 and about 100 μm, provided that the particle aspect ratio is at least 3; and (c) graphite in an amount between about 10 and about 60 weight parts; wherein all weight parts combined together total to 100 weight parts.

In other embodiments, there is disclosed herein a composition as described above wherein component (a) is present in an amount between about 40 and 54 weight parts; component (b) is present in an amount between about 0.5 and about 10 weight parts; and component (c) is present in an amount between about 46 and about 60 weight parts.

In yet another embodiment, there is disclosed herein a composition comprising in admixture (a) an aromatic polyimide in an amount between about 35 and about 90 weight parts; (b) acicular titanium dioxide particles in an amount between about 0.5 and about 4.8 weight parts, wherein the average particle diameter is between about 10 and about 500 nm and the average particle length is between about 1 and about 100 μm, provided that the particle aspect ratio is at least 3; and (c) graphite in an amount between about 0 and about 60 weight parts; wherein all weight parts combined together total to 100 weight parts.

Three dimensional articles comprising these compositions are also provided, as described, for example, in an embodiment in which there is disclosed herein a three-dimensional article comprising an aromatic polyimide resin composition, said composition comprising in admixture (a) an aromatic polyimide in an amount between about 30 and about 90 weight parts; (b) acicular titanium dioxide particles in an amount between about 0.5 and about 10 weight parts, wherein the average particle diameter is between about 10 and about 500 nm and the average particle length is between about 1 and about 100 μm, provided that the particle aspect ratio is at least 3; and (c) graphite in an amount between about 0 and about 60 weight parts; wherein all weight parts combined together total to 100 weight parts. Other articles of manufacture are also disclosed.

DETAILED DESCRIPTION

Disclosed herein are compositions that contain (a) an aromatic polyimide in an amount of about 30 weight parts to about 90 weight parts; (b) acicular titanium dioxide nanoparticles in an amount of about 0.5 weight to about 10 weight parts; and (c) graphite in an amount of about 0 weight parts to about 60 weight parts; where weight parts (a), (b), and (c) combined together total to 100 weight parts.

A polyimide as used as the component "(a)" in a composition hereof is preferably a polymer in which at least about 80%, preferably at least about 90%, and more preferably essentially all (e.g. at least about 98%) of the linking groups between repeat units are imide groups. An aromatic polyimide as used herein includes an organic polymer in which about 60 to about 100 mol %, preferably about 70 mol % or more, and more preferably about 80 mol % or more of the repeating units of the polymer chain thereof have a structure as represented by the following Formula (I):

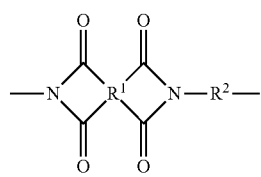

wherein $R^1$ is a tetravalent aromatic radical and $R^2$ is a divalent aromatic radical, as described below.

An aromatic polyimide as used herein is preferably a rigid aromatic polyimide. A polyimide polymer is considered rigid when there are no, or an insignificant amount (e.g. less than 10 mol %, less than 5 mol %, less than 1 mol % or less than 0.5 mol %) of, flexible linkages in the polyimide repeating unit. Flexible linkages are moieties that are predominantly composed of a small number of atoms, and that have an uncomplicated structure (such as straight-chain rather than branched or cyclic), and thus permit the polymer chain to bend or twist with relative ease at the location of the linkage. Examples of flexible linkages include without limitation: —O—, —N(H)—C(O)—, —S—, —SO$_2$—, —C(O)—, —C(O)—O—, —C(CH$_3$)$_2$—, —C(CF$_3$)$_2$—, —(CH$_2$)—, and —NH(CH$_3$)—.

A polyimide polymer suitable for use herein may be synthesized, for example, by reacting a monomeric aromatic diamine compound (which includes derivatives thereof) with a monomeric aromatic tetracarboxylic acid compound (which includes derivatives thereof), and the tetracarboxylic acid compound can thus be the tetracarboxylic acid itself, the corresponding dianhydride, or a derivative of the tetracarboxylic acid such as a diester diacid or a diester diacidchloride. The reaction of the aromatic diamine compound with an aromatic tetracarboxylic acid compound produces the corresponding polyamic acid ("PAA"), amic ester, amic acid ester, or other reaction product according to the selection of starting materials. An aromatic diamine is typically polymerized with a dianhydride in preference to a tetracarboxylic acid, and in such a reaction a catalyst is frequently used in addition to a solvent. A nitrogen-containing base, phenol or an amphoteric material can be used as such a catalyst.

A polyamic acid, as a precursor to a polyimide, can be obtained by polymerizing an aromatic diamine compound and an aromatic tetracarboxylic acid compound, preferably in substantially equimolar amounts, in an organic polar solvent that is generally a high-boiling solvent such as pyridine, N-methylpyrrolidone, dimethylacetamide, dimethylformamide or mixtures thereof. The amount of all monomers in the solvent can be in the range of about 5 to about 40 wt %, in the range of about 6 to about 35 wt %, or in the range of about 8 to about 30 wt %, based on the combined weight or monomers and solvent. The temperature for the reaction is generally not higher than about 100° C., and may be in the range of about 10° C. to 80° C. The time for the polymerization reaction generally is in the range of about 0.2 to 60 hours.

Imidization to produce the polyimide, i.e. ring closure in the polyamic acid, can then be effected through thermal treatment (e.g. as described in U.S. Pat. No. 5,886,129), chemical dehydration or both, followed by the elimination of a condensate (typically, water or alcohol). For example, ring closure can be effected by a cyclization agent such as pyridine and acetic anhydride, picoline and acetic anhydride, 2,6-lutidine and acetic anhydride, or the like.

In various embodiments of the thus-obtained polyimide, about 60 to 100 mole percent, preferably about 70 mole percent or more, more preferably about 80 mole percent or more, of the repeating units of the polymer chain thereof have a polyimide structure as represented by the following Formula (I):

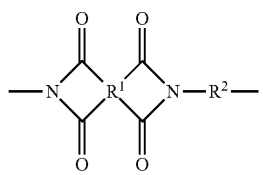

I wherein $R^1$ is a tetravalent aromatic radical derived from the tetracarboxylic acid compound; and $R^2$ is a divalent aromatic radical derived from the diamine compound, which may typically be represented as $H_2N$—$R^2$—$NH_2$.

A diamine compound as used to prepare a polyimide for a composition hereof may be one or more of the aromatic diamines that can be represented by the structure $H_2N$—$R^2$—$NH_2$, wherein $R^2$ is a divalent aromatic radical containing up to 16 carbon atoms and, optionally, containing one or more (but typically only one) heteroatoms in the aromatic ring, a heteroatom being, for example, selected from —N—, —O—, or —S—. Also included herein are those $R^2$ groups wherein $R^2$ is a biphenylene group. Examples of aromatic diamines suitable for use to make a polyimide for a composition hereof include without limitation 2,6-diaminopyridine, 3,5-diaminopyridine, 1,2-diaminobenzene, 1,3-diaminobenzene (also known as m-phenylenediamine or "MPD"), 1,4-diaminobenzene (also known as p-phenylenediamine or "PPD"), 2,6-diaminotoluene, 2,4-diaminotoluene, naphthalenediamines, and benzidines such as benzidine and 3,3'-dimethylbenzidine. The aromatic diamines can be employed singly or in combination. In one embodiment, the aromatic diamine compound is 1,4-diaminobenzene (also known as p-phenylenediamine or "PPD"), 1,3-diaminobenzene (also known as m-phenylenediamine or "MPD"), or mixtures thereof.

Aromatic tetracarboxylic acid compounds suitable for use to prepare a polyimide for a composition hereof may include without limitation aromatic tetracarboxylic acids, acid anhydrides thereof, salts thereof and esters thereof. An aromatic tetracarboxylic acid compound may be as represented by the general Formula (II):

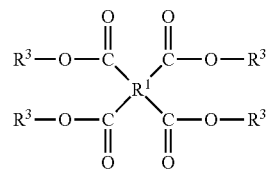

II wherein $R^1$ is a tetravalent aromatic group and each $R^3$ is independently hydrogen or a lower alkyl (e.g. a normal or branched $C_1$~$C_{10}$, $C_1$~$C_8$, $C_1$~$C_6$ or $C_1$~$C_4$) group. In various embodiments, the alkyl group is a $C_1$ to $C_3$ alkyl group. In various embodiments, the tetravalent organic group $R^1$ may have a structure as represented by one of the following formulae:

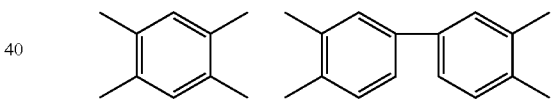

Examples of suitable aromatic tetracarboxylic acids include without limitation 3,3',4,4'-biphenyltetracarboxylic acid, 2,3,3',4'-biphenyltetracarboxylic acid, pyromellitic acid, 2,3,6,7-naphthalenetetracarboxylic acid, and 3,3',4,4'-benzophenonetetracarboxylic acid. The aromatic tetracarboxylic acids can be employed singly or in combination. In one embodiment, the aromatic tetracarboxylic acid compound is an aromatic tetracarboxylic dianhydride. Examples include without limitation 3,3',4,4'-biphenyltetracarboxylic dianhydride ("BPDA"), pyromellitic dianhydride ("PMDA"), 3,3,4,4'-benzophenonetetracarboxylic dianhydride, 1,4,5,8-naphthalenetetracarboxylic dianhydride, 2,3,6,7-naphthalenetetracarboxylic dianhydride, 1,4,5,8-naphthalenetetracarboxylic acid, 2,3,6,7-naphthalenetetracarboxylic acid, and mixtures thereof.

In one embodiment of a composition hereof, a suitable polyimide polymer may be prepared from 3,3',4,4'-biphenyltetracarboxylic dianhydride ("BPDA") as the aromatic tetracarboxylic acid compound, and from a mixture of p-phenylenediamine ("PPD") and m-phenylenediamine ("MPD") as the aromatic diamine compound. In one embodiment, the aromatic diamine compound is greater than 60 to about 85 mol % p-phenylenediamine and 15 to less than 40 mol % m-phenylenediamine. Such a polyimide is described in U.S.

Pat. No. 5,886,129 (which is by this reference incorporated in its entirety as a part hereof for all purposes), and the repeat unit of such a polyimide may also be represented by the structure shown generally in the following Formula (III):

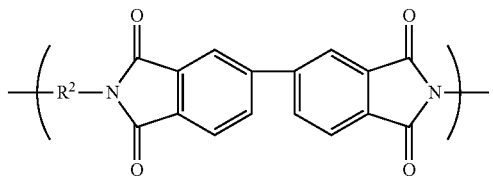

wherein greater than 60 to about 85 mol % of the $R^2$ groups are p-phenylene radicals:

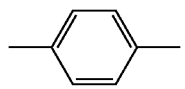

and 15 to less than 40 mol % are m-phenylene radicals:

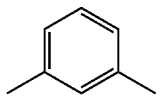

In an alternative embodiment, a suitable polyimide polymer may be prepared from 3,3',4,4'-biphenyltetracarboxylic dianhydride ("BPDA") as a dianhydride derivative of the tetracarboxylic acid compound, and 70 mol % p-phenylenediamine and 30 mol % m-phenylenediamine as the diamine compound.

A polyimide as used herein is preferably an infusible polymer, which is a polymer that does not melt (i.e. liquefy or flow) below the temperature at which it decomposes. Typically, parts prepared from a composition of an infusible polyimide are formed under heat and pressure, much like powdered metals are formed into parts (as described, for example, in U.S. Pat. No. 4,360,626, which is by this reference incorporated as a part hereof for all purposes).

A polyimide as used herein preferably has a high degree of stability to thermal oxidation. At elevated temperature, the polymer will thus typically not undergo combustion through reaction with an oxidant such as air, but will instead vaporize in a thermolysis reaction.

Acicular titanium dioxide particles are used as the component "(b)" in a composition hereof, and these typically take a rutile crystalline form. Acicular titanium dioxide particles suitable for use herein have an average particle diameter in a range (including the endpoints of the range) formed by taking any two of the values in the following list as the endpoints of the diameter range, viz: 10 nm, 30 nm, 50 nm, 70 nm, 90 nm, 110 nm, 130 nm, 150 nm, 200 nm, 250 nm, 300 nm, 400 nm and 500 nm. Acicular titanium dioxide particles suitable for use herein have an average particle length in a range (including the endpoints of the range) formed by taking any two of the values in the following list as the endpoints of the length range, viz: 1 μm, 5 μm, 10 μm, 20 μm, 30 μm, 40 μm, 50 μm, 60 μm, 70 μm, 80 μm, 90 μm and 100 μm. Acicular titanium dioxide particles suitable for use herein have an aspect ratio (i.e. length over diameter) in a range (including the endpoints of the range) formed by taking any two of the values in the following list as the endpoints of the aspect ratio range, viz: 3, 5, 7.5, 10, 12.5, 15, 17.5, 20, 25, 30, 35, 40, 50, 75, 100 and 150. The acicular titanium dioxide particles may have a surface coating of another oxide, for example, $Al_2O_3$.

Acicular titanium dioxide particles suitable for use herein can be made by processes described, for example, in European Patent 341703, Japanese Unexamined Application 02239119, and U.S. Pat. No. 3,579,310; and are commercially available from Ishihara Sangyo Kaisha, Ltd. (ISK) (Osaka, Japan).

Graphite is used as the component "(c)" in a composition hereof. Graphite is typically added to a polyimide composition to improve wear and frictional characteristics, and to control the coefficient of thermal expansion (CTE). The amount of graphite used in a polyimide composition for such purpose is thus sometimes advantageously chosen to match the CTE of the mating components.

Graphite is commercially available in a variety of forms as a fine powder, and may have a widely varying average particle size that is, however, frequently in the range of from about 5 to about 75 microns. In one embodiment, the average particle size is in the range of from about 5 to about 25 microns. In another embodiment, graphite as used herein contains less than about 0.15 weight percent of reactive impurities, such as those selected from the group consisting of ferric sulfide, barium sulfide, calcium sulfide, copper sulfide, barium oxide, calcium oxide, and copper oxide.

Graphite as suitable for use herein can be either naturally occurring graphite or synthetic graphite. Natural graphite generally has a wide range of impurity concentrations, while synthetically produced graphite is commercially available having low concentrations of reactive impurities. Graphite containing an unacceptably high concentration of impurities can be purified by any of a variety of known treatments including, for example, chemical treatment with a mineral acid. Treatment of impure graphite with sulfuric, nitric or hydrochloric acid, for example, at elevated or reflux temperatures can be used to reduce impurities to a desired level.

The acicular $TiO_2$, component (b), and graphite, component (c), as used in the compositions and articles hereof, are frequently incorporated into the heated solvent prior to transfer of the PAA polymer solution as described above, so that the resulting polyimide is precipitated in the presence of the components (b) and (c), which thereby become incorporated into the composition.

In the compositions of this invention, the content of the various components includes all of the formulations in which the compositional content may be expressed by any combination of the various maxima and minima, as set forth below, for any one component of the composition together with any such combination of maxima and minima for either or both of the other two components, viz:

component (a), an aromatic polyimide, is thus present in an amount of about 30 weight parts or more, or about 40 weight parts or more, or about 50 weight parts or more, and yet about 90 weight parts or less, or about 80 weight parts or less, or about 70 weight parts or less;

component (b), acicular $TiO_2$, is thus present in an amount of about 0.5 weight parts or more, or about 1 weight parts or more, or about 2 weight parts or more, about 4 weight parts or more, and yet about 12 weight parts or less, or about 10 weight parts or less, or about 8 weight parts or less, or about 6 weight parts or less; and component (c), graphite, is thus present in an amount of about 0 weight parts or more, or about 5 weight parts or more, or about 10 weight parts or more, about 15 weight parts or more, and yet about 60 weight parts or less, or about 50 weight parts or less, or about 40 weight parts or less, or about 30 weight parts or less.

In a composition hereof, the amounts of the respective weight parts of the three components as combined together in any particular formulation, taken from the ranges as set forth above, will total to 100 weight parts. In embodiments where graphite is present in an amount of 0 weight parts, the composition is formulated in the absence of graphite, which is excluded, and the weight parts of the component (a), a polyimide, and the component (b), an acicular $TiO_2$, will total to 100 weight parts.

In certain embodiments of the compositions hereof, component (a) is present in an amount between about 30 and about 80 weight parts; component (b) is present in an amount between about 0.5 and about 12 weight parts; and component (c) is present in an amount between about 0 and about 60 weight parts.

In other embodiments of the compositions hereof, component (a) is present in an amount between about 40 and about 70 weight parts; component (b) is present in an amount between about 0.5 and about 10 weight parts; and component (c) is present in an amount between about 0 and about 60 weight parts.

In yet other embodiments of the compositions hereof, component (a) is present in an amount between about 40 and about 70 weight parts; component (b) is present in an amount between about 1 and about 10 weight parts; and component (c) is present in an amount between about 5 and about 50 weight parts.

In yet other embodiments of the compositions hereof, component (a) is present in an amount between about 40 and about 70 weight parts; component (b) is present in an amount between about 1 and about 8 weight parts; and component (c) is present in an amount between about 5 and about 50 weight parts.

One or more additives may be used as an optional component "(d)" of a composition hereof. When used, additive(s) may be used in an amount in the range of about 5 to about 70 wt % based on the total weight of all four components together in a 4-component [(a)+(b)+(c)+(d)] composition, with the total weight of three components together in a 3-component [(a)+(b)+(c)] composition being in the range of about 30 to about 95 wt % based on the total weight of all four components together in a 4-component [(a)+(b)+(c)+(d)] composition.

Additives suitable for optional use in a composition hereof may include, without limitation, one or more of the following: pigments; antioxidants; materials to impart a lowered coefficient of thermal expansion, e.g. carbon fibers; materials to impart high strength properties e.g. glass fibers, ceramic fibers, boron fibers, glass beads, whiskers, graphite whiskers or diamond powders; materials to impart heat dissipation or heat resistance properties, e.g. aramid fibers, metal fibers, ceramic fibers, whiskers, silica, silicon carbide, silicon oxide, alumina, magnesium powder or titanium powder; materials to impart corona resistance, e.g. natural mica, synthetic mica or alumina; materials to impart electric conductivity, e.g. carbon black, silver powder, copper powder, aluminum powder or nickel powder; materials to further reduce wear or coefficient of friction, e.g. boron nitride or poly(tetrafluoroethylene) homopolymer and copolymers. Fillers may be added as dry powders to the final resin prior to parts fabrication.

Disclosed herein are parts and other three-dimensional articles (as opposed to, e.g., coatings or films) comprising a composition hereof. By a "part" is meant a three-dimensional shaped object, that may be a final shape that is useful directly, or a "preform", "blank" or "standard shape" that will be cut and/or machined into its final shape. As with products made from other infusible polymeric materials, parts fabricated from a composition hereof may be made by techniques involving the application of heat and pressure (see, for example, U.S. Pat. No. 4,360,626). Suitable conditions may include, for example, pressures in the range of from about from 50,000 to 100,000 psi (345 to 690 MPa) at ambient temperatures. Physical properties of articles molded from a composition hereof can be further improved by sintering, which may typically be performed at a temperature in the range of from about 300° C. to about 450° C.

Parts and other articles prepared from a composition hereof exhibit improved thermal oxidative stability over comparable compositions that do not comprise acicular titanium dioxide and are useful in, for example, aerospace, transportation, and materials handling and processing equipment applications.

Articles prepared from a composition hereof are useful in aerospace applications such as aircraft engine parts, such as bushings (e.g., variable stator vane bushings), bearings, washers (e.g., thrust washers), seal rings, gaskets, wear pads, splines, wear strips, bumpers, and slide blocks. These aerospace application parts may be used in all types of aircraft engines such as reciprocating piston engines and, particularly, jet engines. Other examples of aerospace applications include without limitation: turbochargers; shrouds, aircraft subsystems such as thrust reversers, nacelles, flaps systems and valves, and aircraft fasteners; airplane spline couplings used to drive generators, hydraulic pumps, and other equipment; tube clamps for an aircraft engine to attach hydraulic, hot air, and/or electrical lines on the engine housing; control linkage components, door mechanisms, and rocket and satellite components.

Articles prepared from a composition hereof are also useful in transportation applications, for example, as components in vehicles such as but not limited to automobiles, recreational vehicles, off-road vehicles, military vehicles, commercial vehicles, farm and construction equipment and trucks. Examples of vehicular components include without limitation: automotive and other types of internal combustion engines; other vehicular subsystems such as exhaust gas recycle systems and clutch systems; fuel systems (e.g., bushings, seal rings, band springs, valve seats); pumps (e.g., vacuum pump vanes); transmission components (e.g., thrust washers, valve seats, and seal rings such as seal rings in a continuously variable transmission), transaxle components, drive-train components, non-aircraft jet engines; engine belt tensioners; rubbing blocks in ignition distributors; powertrain applications (e.g., emission components, variable valve systems, turbochargers (e.g., ball bearing retainers, wastegate bushings), air induction modules); driveline applications (e.g., seal rings, thrust washers and fork pads in manual and dual clutch transmissions, transfer cases); seal rings and thrust washers for heavy-duty off-road transmissions and hydraulic motors; bushings, buttons, and rollers for continuous variable transmissions in all-terrain vehicles ("ATVs") and snowmobiles; and chain tensioners for snowmobile gear cases; brake systems (e.g., wear pads, valve components for anti-lock braking systems); door hinge bushings; gear stick rollers; wheel disc nuts, steering systems, air conditioning systems; suspension systems; intake and exhaust systems; piston rings; and shock absorbers.

Articles prepared from a composition hereof are also useful in material handling equipment and materials processing equipment, such as injection molding machines and extrusion equipment (e.g., insulators, seals, bushings and bearings for plastic injection molding and extrusion equipment), conveyors, belt presses and tenter frames; and films, seals, washers, bearings, bushings, gaskets, wear pads, seal rings, slide blocks and push pins, glass handling parts such as clamps and pads, seals in aluminum casting machines, valves (e.g., valve seats, spools), gas compressors (e.g., piston rings, poppets, valve plates, labyrinth seals), hydraulic turbines, metering devices, electric motors (e.g., bushings, washers, thrust plugs), small-motor bushings and bearings for handheld tools appliance motors and fans, torch insulators, and other applications where low wear is desirable.

Articles prepared from a composition hereof are also useful in the manufacture of beverage cans, for example, bushings in body makers that form the can shape, vacuum manifold parts, and shell press bands and plugs; in the steel and aluminum rolling mill industry as bushings and mandrel liners; in gas and oil exploration and refining equipment; and in textile machinery (e.g., bushings for weaving machines, ball cups for knitting looms, wear strips for textile finishing machines).

In some applications, an article prepared from a composition hereof is in contact with metal at least part of the time when the apparatus in which it resides is assembled and in normal use.

EXAMPLES

The advantageous attributes and effects of the compositions hereof may be seen in the examples (Examples 1 and 2) as described below. The embodiments of the composition on which the examples are based are representative only, and the selection of those embodiments to illustrate the invention does not indicate that materials, components, reactants, ingredients, formulations or specifications not described in these examples are not suitable for practicing the inventions herein, or that subject matter not described in these examples are excluded from the scope of the appended claims and equivalents thereof. The significance of the examples is better understood by comparing the results obtained therefrom with the results obtained from certain trial runs that are designed to serve as controlled experiments (Comparative Examples A~C) and provide a basis for such comparison since the compositions therein do not contain the acicular titanium dioxide.

In the examples, the following abbreviations are used: "BPDA" is defined as 3,3',4,4'-biphenyltetracarboxylic anhydride, "g" is defined as gram(s), "mL" is defined as milliliter(s), "mmol" is defined as millimole(s), "MPa" is defined as megapascal(s), "MPD" is defined as m-phenylenediamine, "nm" is defined as nanometer(s), "μm" is defined as micrometer(s), "PPD" is defined as p-phenylenediamine, "psi" is defined as pounds per square inch, "TOS" is defined as thermal oxidative stability, and "wt %" is defined as weight percent (age).

Materials 3,3',4,4'-biphenyltetracarboxylic anhydride was obtained from Mitsubishi Gas Chemical Co., Inc. (Tokyo, Japan). M-phenylenediamine and p-phenylenediamine were obtained from DuPont (Wilmington, Del., USA). The graphite used was a synthetic graphite, maximum 0.05% ash, with a median particle size of about 8 μm. Acicular $TiO_2$ having an average particle diameter of 130 nm and average particle length of 1.68 μm was obtained from Ishihara Sangyo Kaisha Ltd. (Osaka, Japan) and spherical $TiO_2$ having a median particle size of 135 nm was obtained from DuPont (Wilmington, Del., USA).

Methods

Dried polyimide resin was fabricated into tensile bars for TOS measurements by direct forming according to ASTM E8 (2006), "Standard Tension Test Specimen for Powdered Metal Products-Flat Unmachined Tensile Test Bar", at room temperature and 100,000 psi (690 MPa) forming pressure. The tensile bars were sintered at 405° C. for 3 hours with a nitrogen purge.

Example 1

Preparation of a Polyimide Resin Containing 4 Weight % Acicular $TiO_2$

Polyimide resin based on 3,3',4,4'-biphenyltetracarboxylic dianhydride (BPDA), m-phenylene diamine (MPD) and p-phenylene diamine (PPD) was prepared according to the method described in U.S. Pat. No. 5,886,129. Ingredients were 8.79 g MPD (81.3 mmol), 20.52 g (190 mmol) PPD, and 79.55 g (270 mmol) BPDA. The polyamic acid solution thereby produced (500 mL) was imidized in the presence of 1.78 g of acicular $TiO_2$, to produce a polyimide resin containing 4 wt % acicular $TiO_2$. The resin was isolated, washed, and dried. After drying, the resin was ground through a 20 mesh screen using a Wiley mill to form a powder.

Thermooxidative stability (TOS) was measured under 5 atmospheres of air (0.5 MPa) and weight loss after 25 hours at 800° F. (427° C.) is given in Table 1. This determination is an average of two measurements on the same batch of resin.

Comparative Example A

Preparation of Unfilled Polyimide Resin

Polyimide resin based on 3,3',4,4'-biphenyltetracarboxylic dianhydride (BPDA), m-phenylene diamine (MPD) and p-phenylene diamine (PPD) was prepared according to the method of Example 1, but in the absence of $TiO_2$. The TOS of the resulting resin is given in Table 1 and is the average of two measurements on the same batch of resin.

Comparative Example B

Preparation of a Polyimide Resin Containing Spherical $TiO_2$

This resin was prepared by the method of Example 1, except spherical $TiO_2$ was used in place of acicular $TiO_2$. The TOS of the resulting resin is given in Table 1 and is the average of two measurements on the same batch of resin.

Example 2

Preparation of a Polyimide Resin Containing 48 Weight % Graphite and 2 Weight % Acicular $TiO_2$ This resin was prepared by the method of Example 1, except that the polyamic acid solution was imidized in the presence of 42.82 g of graphite and 1.78 g of acicular $TiO_2$, thereby producing a polyimide resin containing 48 wt % graphite and 2 wt % acicular $TiO_2$. The TOS of the resulting resin is given in Table 1 and is the average of two measurements on the same batch of resin.

Comparative Example C

Preparation of Polyimide Resin Containing 50 weight % Graphite

This resin was prepared by the method of Example 2, except that no acicular TiO$_2$ was used in the preparation. The TOS of the resulting resin is given in Table 1 and is the average of fourteen resin batches.

TABLE 1

| Sample | TiO$_2$ particle geometry | Composition (wt %) | | | TOS at 800° F. (427° C.), (% wt loss) |
|---|---|---|---|---|---|
| | | PI | Graphite | TiO$_2$ | |
| Comparative Example A | — | 100 | 0 | 0 | 15.62 |
| Example 1 | Acicular | 96 | 0 | 4 | 2.48 |
| Comparative Example B | Spherical | 96 | 0 | 4 | 4.74 |
| Comparative Example C | — | 50 | 50 | 0 | 2.96 ± 0.77 |
| Example 2 | Acicular | 50 | 48 | 2 | 1.52 |

Where a range of numerical values is recited herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value.

In this specification, unless explicitly stated otherwise or indicated to the contrary by the context of usage, where an embodiment of the subject matter hereof is stated or described as comprising, including, containing, having, being composed of or being constituted by or of certain features or elements, one or more features or elements in addition to those explicitly stated or described may be present in the embodiment. An alternative embodiment of the subject matter hereof, however, may be stated or described as consisting essentially of certain features or elements, in which embodiment features or elements that would materially alter the principle of operation or the distinguishing characteristics of the embodiment are not present therein. A further alternative embodiment of the subject matter hereof may be stated or described as consisting of certain features or elements, in which embodiment, or in insubstantial variations thereof, only the features or elements specifically stated or described are present.

In this specification, unless explicitly stated otherwise or indicated to the contrary by the context of usage, (a) amounts, sizes, ranges, formulations, parameters, and other quantities and characteristics recited herein, particularly when modified by the term "about", may but need not be exact, and may also be approximate and/or larger or smaller (as desired) than stated, reflecting tolerances, conversion factors, rounding off, measurement error and the like, as well as the inclusion within a stated value of those values outside it that have, within the context of this invention, functional and/or operable equivalence to the stated value;

(b) all numerical quantities of parts, percentage or ratio are given as parts, percentage or ratio by weight;

(c) use of the indefinite article "a" or "an" with respect to a statement or description of the presence of an element or feature of this invention, does not limit the presence of the element or feature to one in number; and (d) the words "include", "includes" and "including" are to be read and interpreted as if they were followed by the phrase "without limitation" if in fact that is not the case.

What is claimed is:

1. A composition comprising in admixture
   (a) an aromatic polyimide in an amount between about 30 and about 90 weight parts;
   (b) acicular titanium dioxide particles in an amount between about 0.5 and about 12 weight parts, wherein the average particle diameter is between about 10 and about 500 nm and the average particle length is between about 1 and about 100 μm, provided that the particle aspect ratio is at least 3; and
   (c) graphite in an amount between about 10 and about 60 weight parts;
   wherein all weight parts combined together total to 100 weight parts.

2. The composition according to claim 1 wherein component (a) is present in an amount between about 40 and 54 weight parts; component (b) is present in an amount between about 0.5 and about 10 weight parts; and component (c) is present in an amount between about 46 and about 60 weight parts.

3. A composition comprising in admixture
   (a) an aromatic polyimide in an amount between about 35 and about 90 weight parts;
   (b) acicular titanium dioxide particles in an amount between about 0.5 and about 4.8 weight parts, wherein the average particle diameter is between about 10 and about 500 nm and the average particle length is between about 1 and about 100 μm, provided that the particle aspect ratio is at least 3; and
   (c) graphite in an amount between about 0 and about 60 weight parts;
   wherein all weight parts combined together total to 100 weight parts.

4. A three-dimensional article comprising an aromatic polyimide resin composition, said composition comprising in admixture
   (a) an aromatic polyimide in an amount between about 30 and about 90 weight parts;
   (b) acicular titanium dioxide particles in an amount between about 0.5 and about 10 weight parts, wherein the average particle diameter is between about 10 and about 500 nm and the average particle length is between about 1 and about 100 μm, provided that the particle aspect ratio is at least 3; and
   (c) graphite in an amount between about 0 and about 60 weight parts;
   wherein all weight parts combined together total to 100 weight parts.

5. The article according to claim 4 further comprising as a component (d) one or more additives in an amount in the range of about 5 to about 70 wt % based on the weight of the total (a)+(b)+(c)+(d) composition.

6. The article according to claim 4 which is in the form of a rod, a tube, a plaque, a ring, a disc, or a bar.

7. The article according to claim 4 which comprises a bushing, bearing, washer, seal ring, wear pad, wear strip, spline, gasket, slide block, or valve component.

8. An article according to claim 4 which comprises a vehicular component for an automobile, a recreational vehicle, an off-road vehicle, a military vehicles, a commercial vehicle, farm and construction equipment or a truck, wherein said vehicular component is selected from the group consisting of: internal combustion engines; exhaust gas recycle systems; clutch systems; bushings, seal rings, band springs, and valve seats for fuel systems; pumps; vacuum pump vanes; thrust washers, valve seats, and seal rings in transmissions components; transaxle components; drive-train components; non-aircraft jet engines; engine belt tensioners; rubbing blocks in ignition distributors; powertrain applications; emission components; variable valve systems; turbochargers; ball bearing retainers; wastegate bushings; air induction modules; driveline applications; seal rings, thrust washers and fork pads for use in automatic, continuously variable, and manual transmissions; transfer cases; torque converters; seal rings and thrust washers for heavy-duty off-road transmissions and hydraulic motors; bushings, buttons, and rollers for continuous variable transmissions in all-terrain vehicles and snowmobiles; and chain tensioners for snowmobile gear cases; brake systems components; wear pads for brake systems; valve components for anti-lock braking systems); door hinge bushings; gear stick rollers; wheel disc nuts; steering systems; air conditioning systems; suspension systems; intake and exhaust systems; piston rings; and shock absorbers.

9. An article according to claim 4 which comprises an aerospace application part selected from the group consisting of: aircraft engine parts, turbochargers, shrouds, aircraft subsystems, thrust reversers, nacelles, flaps systems and valves, aircraft fasteners, airplane spline couplings used to drive generators, hydraulic pumps, tube clamps for an aircraft engine, control linkage components, door mechanisms, rocket and satellite components, bushings, variable stator vane bushings, bearings, washers, thrust washers, seal rings, gaskets, wear pads, splines, wear strips, bumpers, and slide blocks.

10. An article according to claim 4 which comprises a part for material handling equipment or materials processing equipment, selected from the group consisting of: injection molding machines; insulators, seals, bushings and bearings for plastic injection molding and extrusion equipment; conveyors, belt presses and tenter frames; films, seals, washers, bearings, bushings, gaskets, wear pads, seal rings, slide blocks and push pins; hot glass handling clamps and pads; insulators; seals in aluminum casting machines, valves, valve seats, spools; gas compressors, piston rings, poppets, valve plates, labyrinth seals; hydraulic turbines; metering devices; bushings, washers, and thrust plugs for electric motors; small-motor bushings and bearings for handheld tools appliance motors and fans; torch insulators; bushings in body makers that form beverage can shapes, vacuum manifold parts, and shell press bands and plugs; bushings and mandrel liners in the steel and aluminum rolling mill industry; gas and oil exploration and refining equipment; and textile machinery, bushings for weaving machines, ball cups for knitting looms, and wear strips for textile finishing machines.

11. The article according to claim 4 wherein the polyimide is prepared from (a) an aromatic tetracarboxylic acid compound or derivative thereof, wherein the aromatic tetracarboxylic acid compound is represented by the Formula (II):

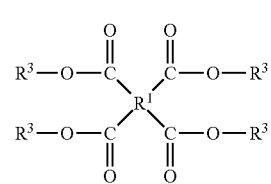

wherein $R^1$ is a tetravalent aromatic group, and each $R^3$ is independently hydrogen or a $C_1$–$C_{10}$ alkyl group, or mixtures thereof; and (b) a diamine compound represented by the structure $H_2N$—$R^2$—$NH_2$, wherein $R^2$ is a divalent aromatic radical containing up to 16 carbon atoms and, optionally, containing in the aromatic ring one or more heteroatoms selected from the group consisting of —N—, —O—, and —S—.

12. The article according to claim 11 wherein the polyimide comprises the recurring unit

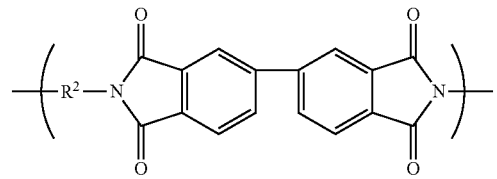

wherein $R^2$ is selected from the group consisting of p-phenylene radicals,

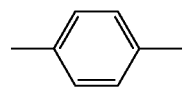

m-phenylene radicals,

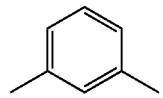

and a mixture thereof.

13. The article according to claim 12 wherein greater than 60 to about 85 mol % of the $R^2$ groups comprise p-phenylene radicals, and about 15 to less than 40 mol % comprise m-phenylene radicals.

* * * * *